United States Patent
Williams et al.

(10) Patent No.: US 6,421,376 B1
(45) Date of Patent: Jul. 16, 2002

(54) METHODS OF USING DIGITAL MODEM IDENTIFICATION INFORMATION

(75) Inventors: Richard G. C. Williams, San Diego; John Rosenlof, La Mesa, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/148,184

(22) Filed: Sep. 3, 1998

(51) Int. Cl.[7] .............................................. H04L 5/16
(52) U.S. Cl. ..................... 375/222; 375/254; 375/258; 375/285; 375/350; 379/345; 379/407; 379/410; 370/287
(58) Field of Search ................................ 375/220, 222, 375/254, 257, 258, 285, 350, 216; 379/406, 407, 410, 344, 345; 370/286, 287

(56) References Cited

U.S. PATENT DOCUMENTS

| | | | | |
|---|---|---|---|---|
| 5,530,724 A | * | 6/1996 | Abrams et al. | 375/345 |
| 5,631,958 A | * | 5/1997 | Reese et al. | 379/410 |
| 5,784,455 A | * | 7/1998 | Edlinger et al. | 379/410 |
| 5,838,786 A | * | 11/1998 | Brown et al. | 379/407 |
| 6,094,422 A | * | 7/2000 | Alelyunas et al. | 370/286 |
| 6,134,224 A | * | 10/2000 | Reese et al. | 370/286 |

* cited by examiner

*Primary Examiner*—Stephen Chin
*Assistant Examiner*—Dac V. Ha
(74) *Attorney, Agent, or Firm*—McDonnell Boehnen Hulbert & Berghoff

(57) ABSTRACT

Improved data communication for modems having digital identification information capability. More particularly, the invention is based on the realization that the ability to signal connection type information between modems permits new uses of existing analog modem configurations, and permits efficiently utilizing an analog modem when communicating with a host modem, the analog modem having a far echo canceling capability, including: determining if the host modem has digital communication capability; communicating between the analog modem and the host modem using analog communication processing if the host modem is determined not to have digital communication capability; communicating between the analog modem and the host modem using a modified communication processing protocol if the host modem is determined to have digital communication capability, the modified communication processing protocol including: terminating any use of the far echo canceling capability of the analog modem for far echo cancellation; optionally applying the far echo canceling capability of the analog modem to improve near echo cancellation for the analog modem; and optionally applying the far echo canceling capability of the analog modem to train for cancellation of any intermediate echo that may affect the analog modem.

10 Claims, 3 Drawing Sheets

METHODS OF USING DIGITAL MODEM IDENTIFICATION INFORMATION

TECHNICAL FIELD

This invention relates to data communications, and more particularly to data communications using modems having digital identification information capability.

BACKGROUND

Data communications often involves the use of modulator/demodulators (modems) to communicate over a voiceband public network system. Until recently, modem connections between such network systems have had two analog links. For example, as shown in FIG. 1, two computers 1, 2 may each have a modem link 3, 4 (land-line or wireless) to the public switched telephone network (PSTN) 5. In such a configuration, each modem conforms to the analog signaling standards of the network. One consequence is that receive and transmit signals are combined on some segments of the analog system. For example, FIG. 2 shows two modems A, B, each having a receiver Rx and a transmitter Tx coupled by means of a corresponding 2-wire to 4-wire hybrid 20A, 20B to 2-wire analog segments 22A, 22B. Elsewhere in the system, within the PSTN 5, the 2-wire segments 22A, 22B are coupled to corresponding 2-wire to 4-wire hybrids 24A, 24B that are intercoupled by a 4-wire segment 26, which may be analog or digital.

A characteristic of such networks is that the hybrids cause echos due to impedance mismatches at the hybrids in the network, and such echoes interfere with communication. The echo experienced by a modem is greatest from the nearest hybrid, and decreases with distance due to the attenuation of the channel. For example, modem A in FIG. 2 would generally experience the largest echo from its own internal hybrid 20A, and a lesser echo from the near network hybrid 24A (because the echo from hybrid 24A is attenuated by the loss of the analog segment 22A). There are also smaller echos from the far network hybrid 24B and the internal hybrid 20B of modem B, but these echos can be treated as one echo. The time between the near and far echoes can be large (e.g., on the order of 2 seconds). Accordingly, most modern modems, such as those that conform to the ITU V.34 standard, have been designed with two echo canceling circuits, one for each of the near and far echo sources. (Occasionally hybrids exist in the middle of these two common sources, and cause a third echo. Most modems cannot deal with such intermediate echos, which contribute to overall noise in the link and reduce connect speeds.) A standard, V.90, has recently been established for a pulse-code modulation (PCM) voiceband modem system. A PCM modem system is different than traditional voiceband modems in that a PCM modem system takes advantage of a frequently-encountered network topology to attain higher data rates. PCM modem communications requires at most one analog component. Such a topology, shown in FIG. 3, includes an Analog Modem coupled to an analog segment 30. Transmit and receive signals are combined on the analog segment 30. The analog segment 30 is coupled to a digital segment 32 through an analog/digital interface 34 that is part of the PSTN 5. Under current standards, the digital segment 32 uses standard transmission facilities (e.g., T1/E1 transmission systems) and provides separate transmit and receive signal paths to a separate receiver Rx and transmitter Tx within a PCM Modem.

The analog/digital interface 34 comprises a combination hybrid and PCM coder/decoder (codec). The hybrid separates the analog transmit and receive signals. The PCM codec provides analog-to-digital (A/D) and digital-to-analog (D/A) conversion and PCM encoding and decoding.

Because the PCM Modem is connected directly to the digital segment 32, the digital-to-analog direction of transmission suffers fewer impairments than a standard analog-to-analog modem connection, as in FIG. 2. The most significant improvement comes from lack of quantization noise. As a result, speeds nearing the 64 Kbps capacity of a digital telephone connection may be achieved in the digital-to-analog direction. However, in the analog-to-digital direction, quantization noise is still a problem due to the PCM codec within the analog/digital interface 34.

In order for modem standards to progress, modems must be able to identify their capabilities to each other. Until recently, there has been no way of signaling to an analog modem that the modem it is talking to is digitally connected. However, recently many modems have begun using an ITU standard, V.8 and/or V.8bis, for identification purposes. This standard includes a "capabilities" information exchange. The ITU has recently agreed to extend the information exchanged to include an indication of a capability for PCM modem operation (PCM capability), and whether a modem has a digital or analog connection to the network (connection type). Under this standard, two analog modems incapable of PCM modem operation would fall back to a traditional analog modem standard, but a PCM digital modem and an analog PCM modem would try to connect as a PCM modem pair.

Another enhancement to the PCM modem standard known as "V.adm" encompasses coupling two PCM modems together by a completely digital link through the PSTN 5. For example, as shown in FIG. 4, a PCM Modem A is coupled to a PCM Modem B by means of separate digital data channels within corresponding digital segments 40A, 40B (the dotted lines withing the PSTN 5 indicate that the connection type within the PSTN is unknown). Such a digital segment may conform, for example, to the ISDN standard.

SUMMARY

The invention includes improved methods of data communication for modems having digital identification information capability. More particularly, the invention is based on the realization that the ability to signal connection type information between modems permits new uses of existing analog modem configurations.

More particularly, the invention permits efficient utilization of an analog modem when communicating with a host modem, the analog modem having a far echo canceling capability, and includes: determining if the host modem has digital communication capability; communicating between the analog modem and the host modem using analog communication processing if the host modem is determined not to have digital communication capability; communicating between the analog modem and the host modem using a modified communication processing protocol if the host modem is determined to have digital communication capability, the modified communication processing protocol including: terminating any use of the far echo canceling capability of the analog modem for far echo cancellation; optionally applying the far echo canceling capability of the analog modem to improve near echo cancellation for the analog modem; and optionally applying the far echo canceling capability of the analog modem to train for cancellation of any intermediate echo that may affect the analog modem.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

The invention includes improved methods for data communications using modems having digital identification information capability. More particularly, the invention is based on the realization that the ability to signal connection type information between modems permits new uses of existing analog modem configurations, such as those shown in FIG. 3.

Capabilities Information Uses with Traditional Modems

Figure 1:
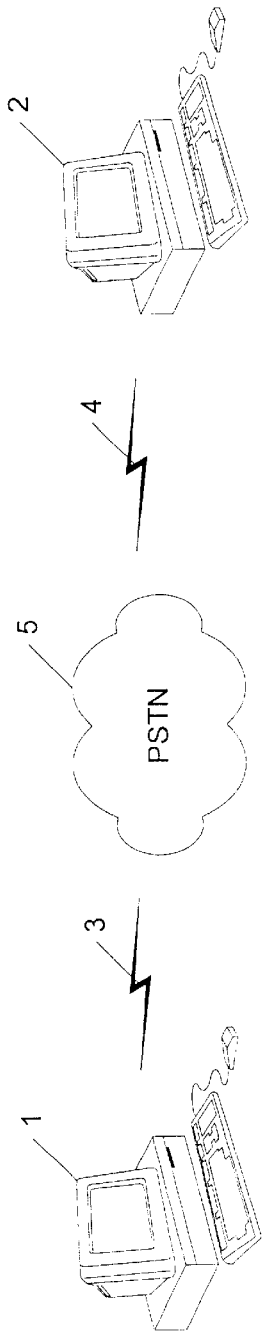
FIG. 1 is a block diagram of two computers connected by a modem to the public switched telephone network, in accordance with the prior art.
Figure 2:
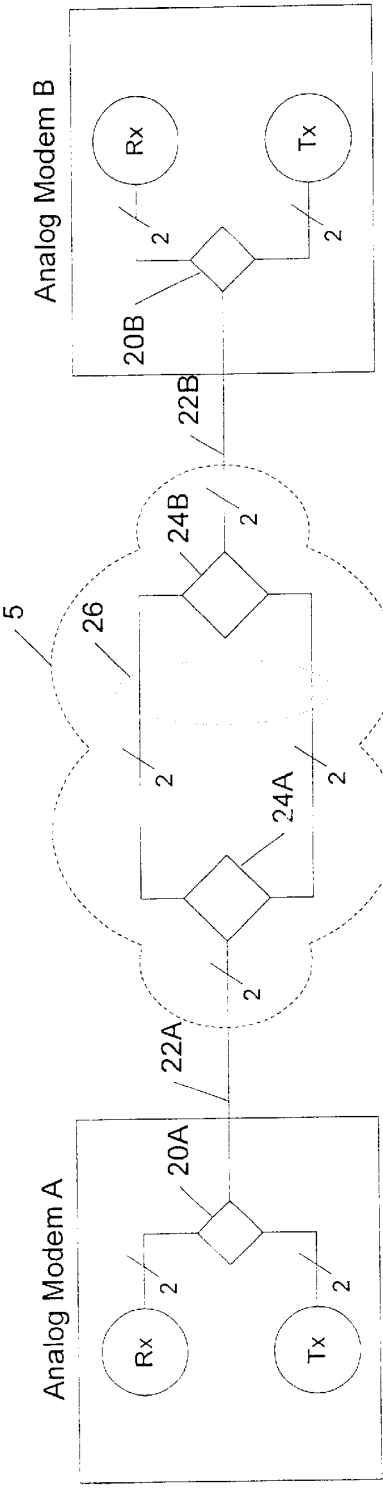
FIG. 2 is a block diagram of public voiceband network connections between an analog-to-analog pair of modems, in accordance with the prior art.
Figure 3:
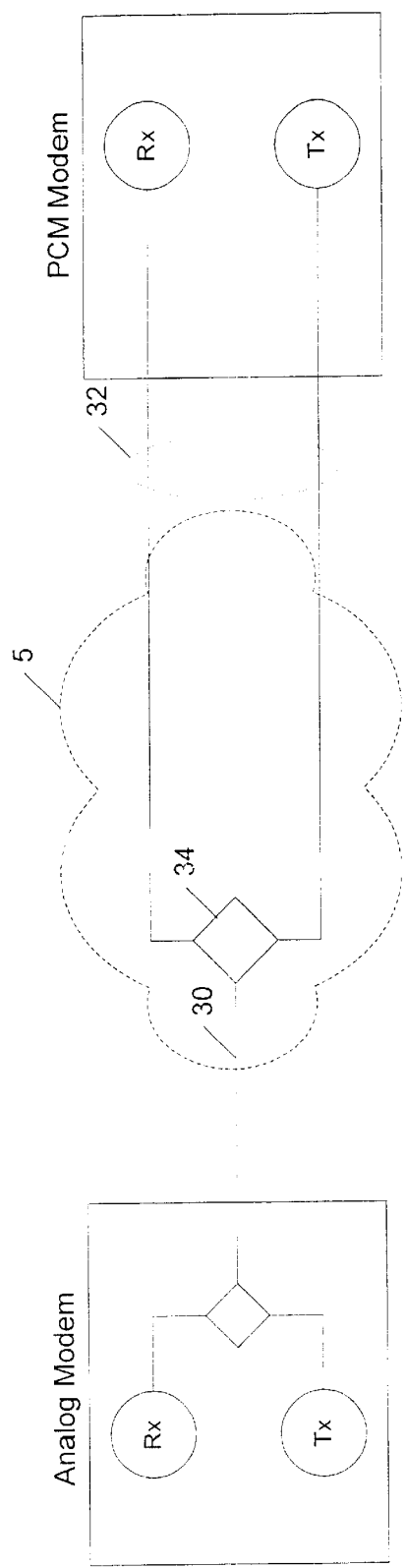
FIG. 3 is a block diagram of public voiceband network connections between an analog-to-digital pair of modems, in accordance with the prior art.
Figure 4:
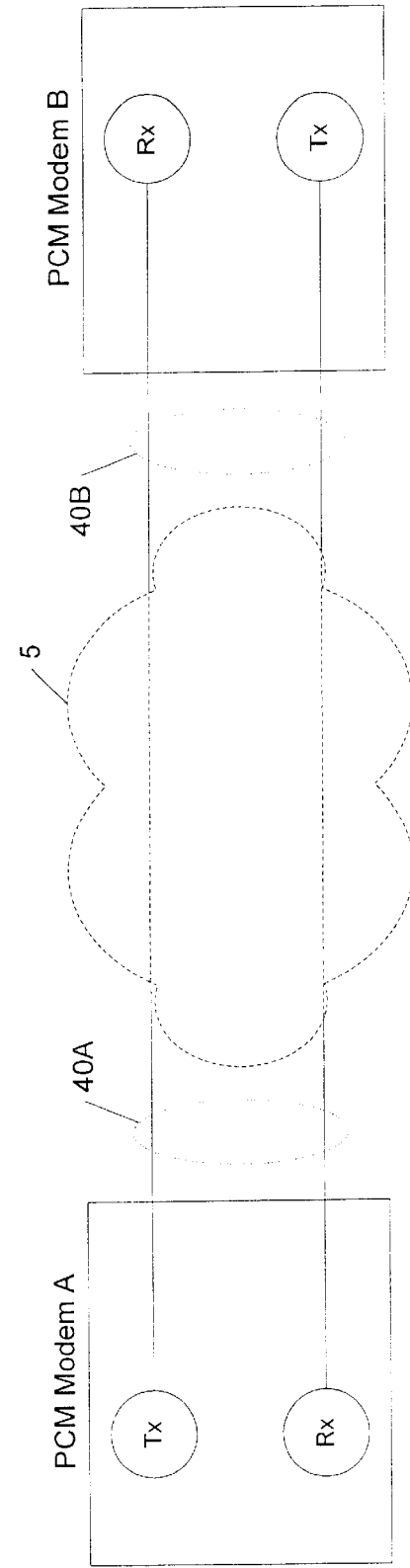
FIG. 4 is a block diagram of public voiceband network connections between an digital-to-digital pair of modems, in accordance with the prior art.

Referring now to the configuration shown in FIG. 3, when a PCM Modem is connected to a network digitally, the PCM Modem produces no echo. If this is known to an Analog Modem, the Analog Modem can take advantage of this information in several ways. Under conventional echo canceling modem standards, processing power must be expended on canceling the echo from a far analog modem, as described above with respect to FIG. 1. However, in the configuration shown in FIG. 3, there is no far analog modem. Accordingly, the Analog Modem will now have surplus processing power which it can apply in other ways. For example, the Analog Modem can simply stop far echo training and divert the surplus processing power to other functions. This option is particularly attractive for software-based modems, since the processing power will be returned to the host computer. As another example, the Analog Modem can use all of its echo canceling processing power to improve the performance of its echo canceler for the near end, where there is still an echo due to the hybrid in the analog/digital interface 34. As yet another example, since the conventional far echo canceler is not needed for its normal purpose, the surplus processing power may be used to train the far end canceler to cancel any intermediate echo that may be present, thus improving performance of the Analog Modem and increasing connect speed. In many cases where an intermediate echo does exist, the intermediate echo is currently ignored to the detriment of the connect speed of a modem.

Figure 5:
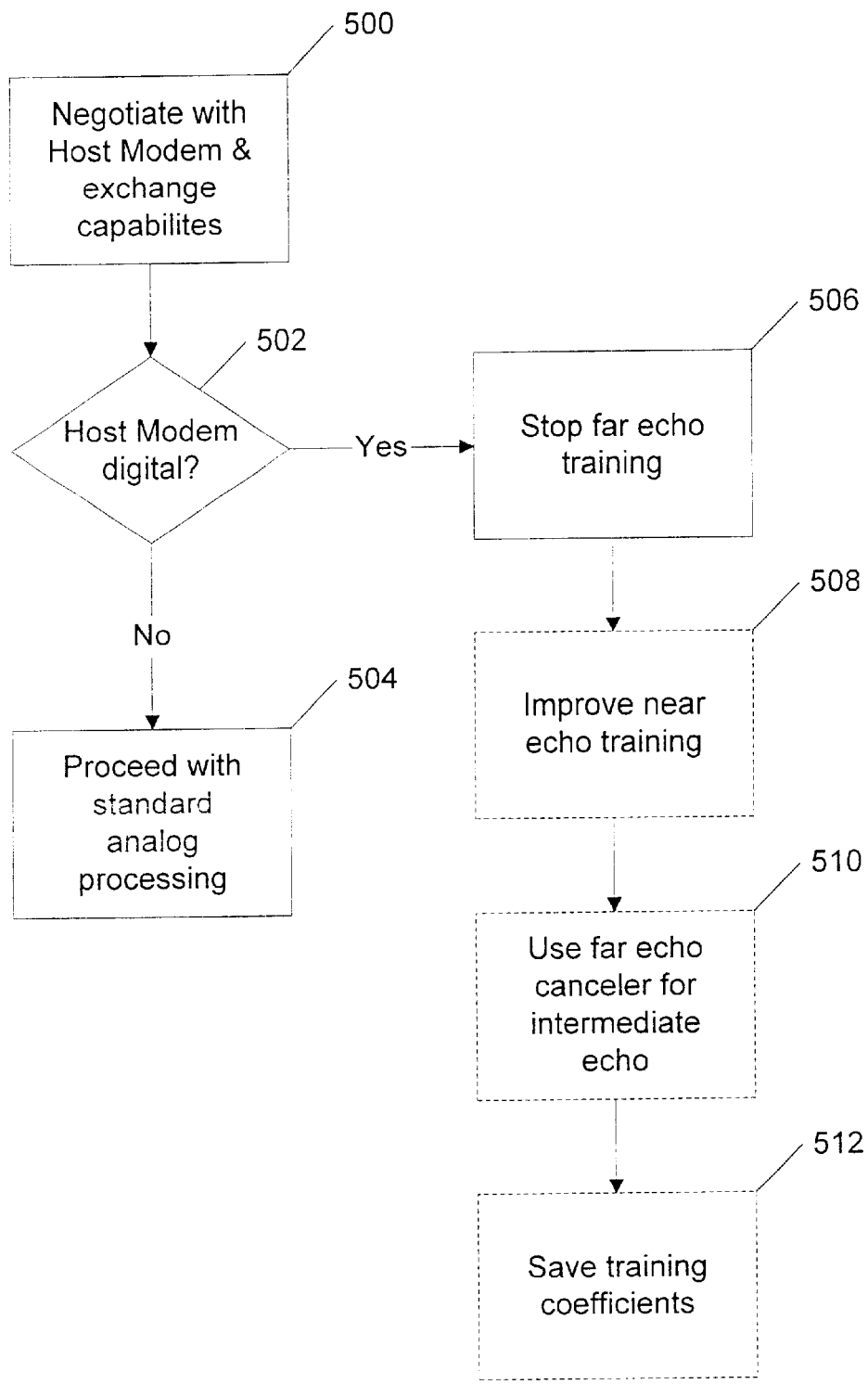
FIG. 5 is a flowchart showing various uses of PCM capability information signaling between a client Analog Modem and a host modem.

FIG. 5 is a flowchart showing various uses of modem capability information signaling between a client Analog Modem and a host modem, utilizing the modified communication processing protocol of the invention. The Analog Modem first enters a negotiation session with a host modem, and the modems exchange capabilities (STEP 500). A determination is made by the Analog Modem from the exchanged capability information as to whether the host modem is analog or digital (STEP 502). If the host is analog, the Analog Modem proceeds with standard analog processing, such as echo cancellation training (STEP 504). However, if the host modem is determined to be digitally connected (STEP 502), then the Analog Modem is programmed to stop far echo training, since there is no far hybrid in the system (STEP 506). Optionally, the Analog Modem can use the surplus processing resources gained from stopping far echo training to improve near echo training (e.g., by training a longer echo canceler) (STEP 508). Alternatively or in addition to improving near echo training, the Analog Modem optionally may use the surplus processing resources and the otherwise unused far echo canceler circuitry to train for cancellation of any intermediate echo that may be present (STEP 510).

Another use for the information that there is a digitally connected modem in a connecting pair, as shown in FIG. 3, is the use of the implication that there is a digital link in the connection. In the V.34 modem standard, there are a number of options which are invoked when certain conditions are found to exist. One condition is the presence of a digital link. This information is now explicitly communicated when a client analog modem communicates with a digitally connected modem, and does not need to be determined by signal analysis or other means. This can save processing time and effort.

Another advantage of knowing that any particular host modem is a digital modem is the realization that it is likely that only a single analog segment 30 exists in the connection, from the client Analog Modem to the PSTN 5, as shown in FIG. 3. Accordingly, the Analog Modem can be programmed to save its equalizer and echo canceler coefficients after training and apply the same coefficients as initial conditions to reduce training time on subsequent calls because the relevant communication characteristics of the analog segment 30 are normally constant from connection to connection. More particularly, when one part of the channel is a digital segment 32, the attenuation distortion and delay distortion introduced by the analog segment 30 are relatively constant and the equalizer coefficients describing this distortion can be used to reduce training time on the next call. Likewise, because the impedance of the analog segment 30 is relatively constant, so too are the characteristics of the echo path, and saved echo canceler coefficients can be used to reduce echo training time on the next call. Thus, as a last step in FIG. 5, an Analog Modem optionally may store its training coefficients for subsequent use (STEP 512).

The invention may be implemented in hardware or software, or a combination of both. However, preferably, the invention is implemented in a conventional modem by means of a computer program executing on one or more programmable systems each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion. The processor may be, for example, a digital signal processor (DSP).

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM or magnetic media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for efficiently utilizing an analog modem when communicating with a host modem, the analog modem having a far echo canceling capability, including the steps of:
    (a) determining if the host modem has digital communication capability;
    (b) communicating between the analog modem and the host modem using a modified communication processing protocol if the host modem is determined to have digital communication capability, the modified communication processing protocol including terminating any use of the far echo canceling capability of the analog modem for far echo cancellation; and
    (c) applying the far echo canceling capability of the analog modem to improve near echo cancellation for the analog modem.

2. The method of claim 1, the modified communication processing further including communicating between the analog modem and the host modem using analog communication processing if the host modem is determined not to have digital communication capability.

3. The method of claim 1, the modified communication processing further including applying the far echo canceling capability of the analog modem to train for cancellation of any intermediate echo that may affect the analog modem.

4. A method for utilizing an analog modem when communicating with a host modem, the analog modem having a far echo canceling capability, including the steps of:
    (a) determining if the host modem has digital communication capability;
    (b) communicating between the analog modem and the host modem using a modified communication processing protocol if the host modem is determined to have digital communication capability, the modified communication processing protocol including the steps of:
        (1) terminating any use of the far echo canceling capability of the analog modem for far echo cancellation;
        (2) selectively applying the far echo canceling capability of the analog modem to improve near echo cancellation for the analog modem; and
        (3) selectively applying the far echo canceling capability of the analog modem to train for cancellation of any intermediate echo that may affect the analog modem.

5. The method of claim 4, the modified communication processing further including communicating between the analog modem and the host modem using analog communication processing if the host modem is determined not to have digital communication capability.

6. An analog modem for efficiently communicating with a host modem, including:
    (a) far echo canceling capability;
    (b) means for determining if the host modem has digital communication capability;
    (c) means for communicating between the analog modem and the host modem using a modified communication processing protocol if the host modem is determined to have digital communication capability, the modified communication processing protocol including means for terminating any use of the far echo canceling capability of the analog modem for far echo cancellation; and
    (d) means for applying the far echo canceling capability of the analog modem to improve near echo cancellation for the analog modem.

7. The analog modem of claim 6, the modified communication processing further including means for communicating between the analog modem and the host modem using analog communication processing if the host modem is determined not to have digital communication capability.

8. The method of claim 6, the modified communication processing further including means for applying the far echo canceling capability of the analog modem to train for cancellation of any intermediate echo that may affect the analog modem.

9. An analog modem for efficiently communicating with a host modem, including:
    (a) far echo canceling capability;
    (b) means for determining if the host modem has digital communication capability;
    (c) means for communicating between the analog modem and the host modem using a modified communication processing protocol if the host modem is determined to have digital communication capability, the modified communication processing protocol including means for:
        (1) terminating any use of the far echo canceling capability of the analog modem for far echo cancellation;
        (2) selectively applying the far echo canceling capability of the analog modem to improve near echo cancellation for the analog modem; and
        (3) selectively applying the far echo canceling capability of the analog modem to train for cancellation of any intermediate echo that may affect the analog modem.

10. The analog modem of claim 9, the modified communication processing further including means for communicating between the analog modem and the host modem using analog communication processing if the host modem is determined not to have digital communication capability.

\* \* \* \* \*